H. K. PORTER.

WHIFFLETREE CENTERS.

No. 7,373. Reissued Oct. 31, 1876.

WITNESSES.

Samuel D. Kelley.

Eugene Humphrey

INVENTOR.

Henry K. Porter

UNITED STATES PATENT OFFICE.

HENRY K. PORTER, OF BOSTON, MASSACHUSETTS.

IMPROVEMENT IN WHIFFLETREE-CENTERS.

Specification forming part of Letters Patent No. 156,437, dated November 3, 1874; reissue No. 7,373, dated October 31, 1876; application filed October 16, 1876.

*To all whom it may concern:*

Be it known that I, HENRY K. PORTER, of Boston, in the county of Suffolk and State of Massachusetts, have invented a new and useful Whiffletree-Center, of which the following is a specification:

The invention consists in the peculiar construction of the two halves of the "center," which are formed of cast metal, with segmental locks or flanges, and corresponding apertures beneath the locks, which are cut through the bed-plate, to allow an expeditious and inexpensive process of manufacture by reason of the said apertures, which facilitate the process of molding, which precedes the casting process. It also consists in a circular central thimble and recess, formed respectively in the said halves, in combination with the said segmental lock; the whole so constructed as that the two halves of the center may be rotated relatively to each other, and held centrally in position by such thimble and recess, and also held in position relatively to their planes, by such engaging locks or flanges, so formed respectively upon the said parts of the center.

Figure 1:
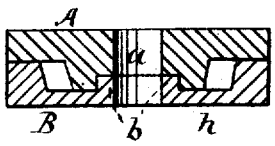
Figure 2:
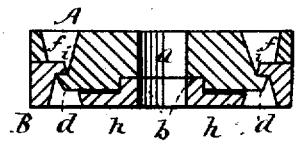
Figure 3:
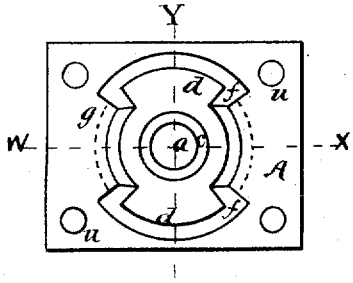
Figure 4:
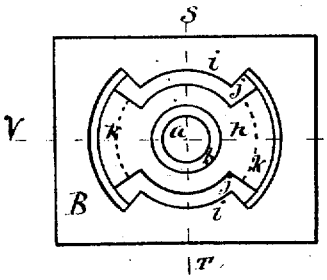
Figure 5:
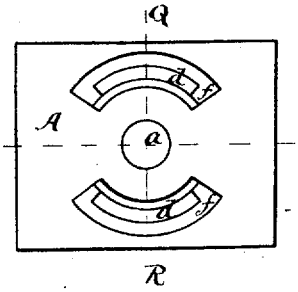
Figure 6:
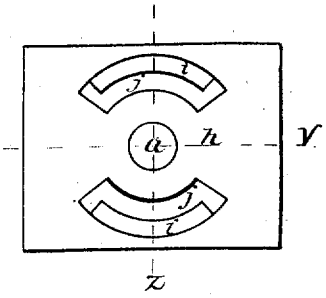

Figure 1 is a vertical section taken on line W X, Fig. 3, and line U V, Figs. 4, 5, and 6, and shows the halves of the circle when united, the line of this section being in the direction of the axis of the whiffletree. Fig. 2 is also a vertical section, taken on the lines Q R S T and Y Z of Figs. 3, 4, 5, and 6. Fig. 3 is a bottom side or plan view of A. Fig. 4 is a top side or plan view of B. Fig. 5 is a top side or plan view of A. Fig. 6 is a bottom side or plan view of B.

A is the half of the circle which is attached to the whiffletree, and B that which is secured to the cross-bar by screws, as shown at *u*. *a* is the hole for the bolt; and *b* is a concentric flange formed upon B, and which fits into the circular recess formed in A. (Shown in Figs. 1 and 2, and marked *c* in Fig 3.) *d d* are flanges forming segments of a circle, a part, as shown by inside dotted lines *g*, being cut away for the purpose hereinafter stated. *f f* are apertures corresponding to, but slightly larger than, the flanges *d*, and cut through bed A, so that, when molded for casting, the sand beneath flanges *d d* and between its lower plane and the upper plane of the main bed, as shown in Fig. 3, shall be supported by that in recess *f*, and allow the withdrawal of the pattern, yet leaving the perfect sand mold beneath the flanges. *h*, Figs. 1, 2, and 6, represents a thin bar, extending across the aperture in circle B, the circular flange or thimble *b* being formed upon this bar. *i i* are two segmentary flanges, formed flush with the top of the circle or plate B, as shown in Fig. 2. The dotted line *k*, Fig. 4, shows the part of this circular flange which is cut away for the purpose hereinafter stated. *j j* are apertures directly beneath, but slightly larger than, flanges *i i*, and which constitute the space between bar *h* and the circular space cut in the main bed. The object of these spaces *j* is the same as the spaces *f f* in circle A, as before explained.

For the purpose of uniting these two halves of the circle, one half is rotated horizontally ninety degrees relatively to the other, when the flanges *d d* of plate A will occupy the space *k*, cut away between the flanges *i i*, plate B, and the flanges *i i* will occupy the spaces *g*, cut away between the flanges *d* in plate A, thereby allowing the main plates to be brought together, when, by rotating one of the plates ninety degrees, the flanges *d d* and *i i* will be locked each behind the other, as shown in Fig. 2, while the circular flange *b* serves to prevent all lateral motion.

By this peculiar construction I am enabled to cast, perfect, and finish a centrally-pivoted and most safely-locking circle, without increase of expense over the most unsafe kind.

Having thus described my invention, what I claim is—

1. A whiffletree circle or center, consisting of the combined parts A B, formed respectively with the flanges *d d* and *i i* and the apertures *f f* and *j j*, substantially as described and shown.

2. In a whiffletree center, formed with the interlocking flanges *d d* and *i i* upon the respective halves, the central thimble or flange *b*, and corresponding recess *c*, substantially as and for the purposes specified.

HENRY K. PORTER.

Witnesses:
EUGENE HUMPHREY,
EBEN HUTCHINSON.